Patented July 28, 1942

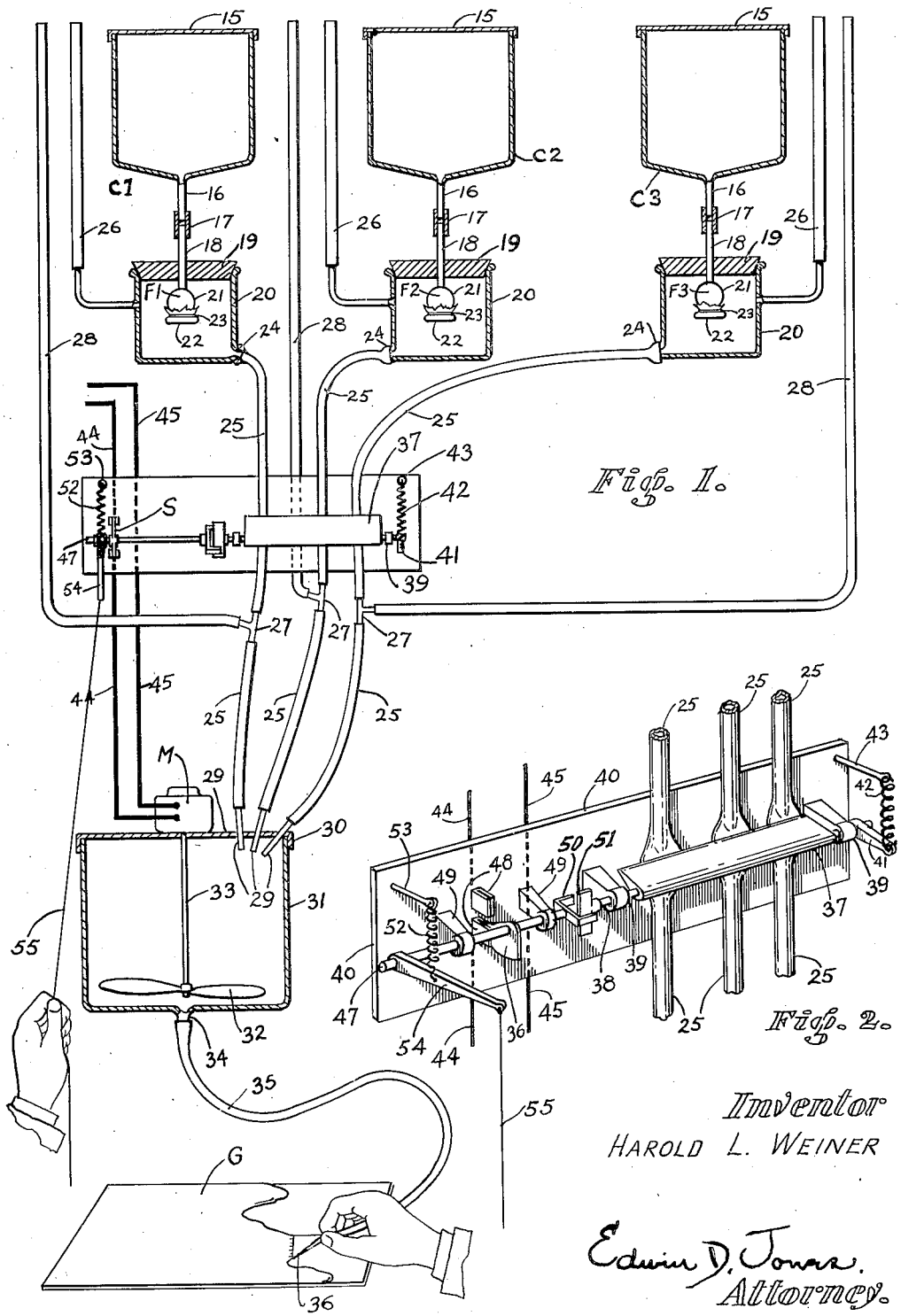
July 28, 1942.  H. L. WEINER  2,291,267
APPARATUS FOR PRODUCING AND APPLYING SILVERING SUBSTANCES
Filed Jan. 30, 1940
Inventor
HAROLD L. WEINER
Edwin D. Jonas
Attorney.

2,291,267

UNITED STATES PATENT OFFICE 2,291,267

APPARATUS FOR PRODUCING AND APPLYING SILVERING SUBSTANCES

Harold L. Weiner, Los Angeles, Calif.

Application January 30, 1940, Serial No. 316,342

4 Claims. (Cl. 259—8)

My invention relates to those silvering substances for mirrors, reflectors and the like, produced by the chemical reduction of silver salts to the metallic state, and it has for a purpose the provision of an apparatus by which the chemicals necessary to such reduction are maintained separated from the salts and mixed and combined therewith only when and as needed and in such manner as to permit and facilitate immediate application of the final mixture so as to eliminate the possibility of the salts becoming oxidized before application.

It is also a purpose of my invention to provide an apparatus as above described, which is further characterized by having a single manually operable means for controlling and effecting mixing and combining of the reducing chemicals and salts in the production of a silvering substance, and the immediate application of such substance to a surface to be mirrored, all in a continuous operation.

A further purpose of my invention is the provision of an apparatus which embodies a motor operated mixer, valves for controlling the passage of the silvering forming salts to the mixer, and a switch controlling the supply of electrical current to the motor, the switch and valves being operable to cause actuation of the mixer only after a quantity of the solutions have been supplied to the mixer so as to insure thorough intermixing of the solutions before the resultant mixture is discharged onto the surface to be silvered.

I will describe only one form of apparatus for producing and permitting and facilitating immediate application of a silvering substance to a surface to be silvered embodying my invention and will then point out the novel features thereof in claims.

In the accompanying drawing:

Fig. 1 is a schematic view showing one form of apparatus embodying my invention.

Fig. 2 is an enlarged view showing in perspective the valve and motor control means of Fig. 1.

Referring specifically to the drawing in which similar reference characters refer to similar parts in each of the several drawings, my invention in its present embodiment, comprises three containers C1, C2 and C3, preferably of glass, and three filtering units F1, F2 and F3, one for each of the containers, and situated below the latter. Any number of containers and their companion filtering units may be employed, but I employ three because the particular formula for producing the silvering substance which I have selected by way of example consists of three solutions which are as follows:

Solution 1.—Sodium hydroxide (C. P. crystals); distilled water.

Solution 2.—Silver nitrate (crystals); distilled water; ammonium hydroxide (28%).

Solution 3.—Pure sugar (rock candy); distilled water; sulphuric acid (U. S. P. sp. gr. 1,834); ethyl alcohol (pure).

Each container C1, C2 and C3, is provided at its top with a removable cover 15, and at its bottom with an outlet 16 which through a rubber tube 17 is connected to an inlet tube 18. This tube 18 extends centrally through a stopper 19 (preferably formed of rubber) which fits in and closes the top of a receptacle 20 (preferably formed of glass).

Each receptacle 20 forms part of the respective filtering unit F1, F2 or F3, and contained within the receptacle is an inverted bowl 21 formed on and communicating with the lower end of the inlet tube 18. The open bottom of the bowl 21 is spanned by a filtering cloth 22 removably secured thereto in any suitable manner such as by a rubber band 23. At the bottom of the receptacle and peripherally thereof is an outlet 24 to which is connected the upper end of a downwardly extending tube 25, preferably formed of rubber. A vent pipe 26 extends from the side of the receptacle upwardly to a point slightly above the top thereof to allow the escape of air without the escape of the solution.

Each of the tubes 25 is made in two sections connected by a T pipe 27 to one branch of which is connected a vent pipe 28 provided for the same purpose as the vent pipe 26. The lower end of the lower section of the tube 25 is connected to a short length of pipe 29 which extends through the cover 30 of a vat 31 of a solution mixing device D. As illustrated, the three pipes 29 are in convergent relation to each other so their lower ends discharge the solutions in meeting jets to effect an initial intermixing of the solutions.

The mixing device D also includes an agitator 32 fixed on the lower end of a shaft 33 journaled in the cover 30 and connected to an electric motor M so as to be driven by the latter. The bottom of the vat 31 is provided with an outlet 34 to which is connected the upper end of a flexible pipe 35, preferably of rubber, the lower end of the pipe carrying a nozzle 36.

As best shown in Fig. 2, the three tubes 25 extend to the rear of a pinch-type of valve 37 fixed to a shaft 38 journaled in bearings 39 carried by a supporting panel 40. An arm 41 is fixed to one end of the shaft 38 and connected to a contractile spring 42 supported on the panel by a rod 43. Under the action of the spring 42 the valve 37 is normally urged to the closed or tube pinching position shown, so that the solutions cannot flow through the tubes 25. Although the valve 37 is referred to as a single valve, it is obvious that it possesses the function of three valves for it controls liquid flow through each of the tubes 25.

The motor M is provided with a circuit including conductors 44 and 45, a switch S in the conductor 44, and a suitable source of current (not shown) connected to the conductors. The switch S is of the single blade type, the blade 36 being fixed to a shaft 47 so that by rotation of the latter it can be caused to bridge or unbridge a pair of contacts 48 mounted on the panel 40.

The shaft 47 is journaled in brackets 49 on the panel 40 so as to be alined with the shaft 38, and the confronting ends of these two shafts have a lost motion connection whereby upon rotation of the shaft 47 to close the switch S, the shaft 38 is rotated to open the valve 37, but in a delayed movement so that such valve opening occurs after closing of the switch. The purpose of this is to set the agitator 32 into operation slightly before the solutions from the tubes 25 are admitted to the mixing vat 31.

The lost motion connection may comprise a yoke 50 fixed to the shaft 47, and a transverse extension 51 fixed to the confronting end of the shaft 38 and disposed between and in the path of movement of the parallel portions of the yoke. The shaft 47 is urged to a position in which the switch S is open, by means of a spring 52 depending from a rod 53 projecting from the panel 40, and connected to a lever 54 fixed on the shaft 47. As the lever 54 is situated a considerable distance above the pipe 35 and the nozzle 36 employed for applying silvering mixture to the surface of a plate of glass indicated at G in Fig. 1, a cord 55 is connected to the lever and of such length that it is within reach of the operator to actuate the lever with one hand while the nozzle 36 is being manipulated with the other hand to flow the silvering substance onto the glass.

In the operation of the apparatus, the three solutions are placed in the respective containers C1, C2, and C3, from which they flow into the receptacles 20, the filters 22 removing all solid particles from the solutions. From the receptacles the solutions flow into the tubes 25 until they reach those portions pinched by the valve 37 when further flow is stopped.

To effect discharge of the final mixture from the nozzle 36 the cord 55 is pulled to first rotate the shaft 47 and then the shaft 38, thereby first closing the switch S to set the agitator 32 into operation and then opening the valve 37 to permit a gravitational flow of the three solutions from the tubes 25 into the mixing vat 31. Owing to the delayed opening of the valve 37, the solutions reach the vat only after the agitator has been set into operation, thus insuring thorough intermixing of the solutions to produce the completed mixture before discharge thereof from the vat. With the completed mixture now passing from the vat into the tube 35, as emitted from the nozzle 36, it may be flowed onto the glass G or any other surface to be silvered.

Flow of the silvering substance from the nozzle as well as flow of the solutions to the mixer may be discontinued by a mere release of the cord 55, for then the springs 42 and 52 function to return the switch S to open position and the valve 37 to closed position.

From the above mode of operation of my apparatus, it will be manifest that the solutions necessary to produce the silvering substance are normally maintained separated one from the other and only mixed to reduce the silver salts to a metallic state when and as required. Thus, there can be no oxidation of the salts before application of the silvering substance to a surface to be mirrored.

Although I have herein shown and described only one form of apparatus for producing and facilitating application of a silvering substance to a surface embodying my invention, it is to be understood that various changes and modifications may be made herein without departing from the spirit of my invention and the spirit and scope of the appended claims.

I claim:

1. An apparatus of the character described, comprising; containers for individually holding a plurality of chemical solutions; a mixer for the solutions; pipes affording communication between the mixer and each of said containers; an actuator for the mixer, including an electric motor and a switch for controlling current supply to the motor; valves for the pipes; means for urging the switch to open position; means for urging the valves to closed position; and a single manually operable means for first moving the switch to closed position against the action of its urging means, and then moving the valves to open position against the action of their urging means, whereby the mixer is set into operation before the solutions reach the mixer.

2. An apparatus of the character described comprising; containers for individually holding a plurality of chemical solutions; a mixer for the solutions including a receptacle, an agitator in the receptacle, an electrical motor for the agitator, and a current control switch for said motor; pipes affording communication between the receptacle and the containers; valves for said pipes to control the passage of the solutions from the containers to the receptacle; separate shafts for the switch and the valves; means for separately urging said shafts to positions in which the switch is open and the valves closed; manually operable means for rotating the switch shaft against the action of its urging means to close said switch; and a connection between said shafts for transmitting the switch closing movement of the switch shaft to the valve shaft for rotating the latter against the action of its urging means to open said valves.

3. An apparatus of the character described comprising; containers for individually holding a plurality of chemical solutions; a mixer for the solutions including a receptacle, an agitator in the receptacle, an electrical motor for the agitator, and a current control switch for said motor; compressible tubes affording communication between the receptacle and the containers; a valve common to all of the tubes for compressing the latter to stop the passage of the solutions from the containers to the receptacle; separate shafts for the switch and the valve; means for separately urging said shafts to positions in which the switch is open and the valve closed; manually operable means for rotating the switch shaft against the action of its urging means to close the switch; and a connection between said shafts for transmitting the switch closing movement of the switch shaft to the valve shaft for rotating the latter against the action of its urging means to open the valve.

4. An apparatus as embodied in claim 2, wherein said connection comprises elements on the shafts constructed and arranged to permit the switch shaft to close the switch before the valve shaft closes the valves.

HAROLD L. WEINER.